United States Patent
Round (10) Patent No.: US 7,624,047 B1
(45) Date of Patent: Nov. 24, 2009

(54) MANAGING SERVER LOAD BY VARYING RESPONSES TO REQUESTS FOR DYNAMICALLY-GENERATED WEB PAGES

(75) Inventor: Matthew J. Round, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 935 days.

(21) Appl. No.: 10/390,067

(22) Filed: Mar. 14, 2003

Related U.S. Application Data (60) Provisional application No. 60/400,079, filed on Jul. 31, 2002.

(51) Int. Cl.
G06F 15/173 (2006.01)
G06F 17/30 (2006.01)

(52) U.S. Cl. .......................... 705/27; 709/223; 709/226

(58) Field of Classification Search .................... 705/27
See application file for complete search history.

(56) References Cited

U.S. PATENT DOCUMENTS

| | | | |
|---|---|---|---|
| 5,819,045 A | | 10/1998 | Raman et al. |
| 6,128,279 A | * | 10/2000 | O'Neil et al. ............... 370/229 |
| 6,240,454 B1 | * | 5/2001 | Nepustil ...................... 709/229 |
| 6,243,761 B1 | * | 6/2001 | Mogul et al. ................ 709/246 |
| 6,266,649 B1 | | 7/2001 | Linden et al. |
| 6,415,335 B1 | * | 7/2002 | Lowery et al. ................. 710/5 |
| 6,816,907 B1 | * | 11/2004 | Mei et al. .................... 709/229 |
| 6,823,374 B2 | * | 11/2004 | Kausik et al. ............... 709/219 |
| 2002/0107027 A1 | * | 8/2002 | O'Neil ........................ 455/456 |
| 2004/0003029 A1 | | 1/2004 | Islam et al. |
| 2004/0117376 A1 | * | 6/2004 | Lavin et al. ................... 707/10 |
| 2005/0097445 A1 | | 5/2005 | Day et al. |

FOREIGN PATENT DOCUMENTS

| | | |
|---|---|---|
| WO | WO 01/89176 A2 | 11/2001 |
| WO | WO 01/95543 A2 | 12/2001 |

OTHER PUBLICATIONS

Vasiliou, N., "*Reading Course Paper Overview of Internet QoS and Web Server QoS*," pp. 1-37, dated Apr. 6, 2000.

* cited by examiner

*Primary Examiner*—F. Zeender
*Assistant Examiner*—Faris Almatrahi
(74) *Attorney, Agent, or Firm*—Knobbe, Martens, Olson & Bear LLP (57) ABSTRACT

A web server system regulates its own load level by dynamically varying its responses to requests for like web pages. The responses are preferably varied at least in-part using variables that directly or indirectly specify the type and/or quantity of processing to be performed in responding to requests for dynamically-generated web pages. The type of response generated by the web server system is preferably selected based upon one or more of the following: (a) the current load level of the server system as a whole, (b) the current load levels of specific computing devices or components invoked by the request, and (c) a profile of the user who requests the page.

29 Claims, 4 Drawing Sheets

MANAGING SERVER LOAD BY VARYING RESPONSES TO REQUESTS FOR DYNAMICALLY-GENERATED WEB PAGES

PRIORITY CLAIM

This application claims the benefit of U.S. Provisional Appl. No. 60/400,079, filed Jul. 31, 2002.

BACKGROUND OF THE INVENTION

1. Field of the Invention

This invention relates to systems and methods for managing load levels of web server systems that generate and personalize web pages dynamically.

2. Description of the Related Art

The term "load" is commonly used to describe how much of a computing device's or system's resources are being used. These resources can include, for example, processing capacity, random access memory, incoming and outgoing communication bandwidth, and/or disk input/output (I/O) capacity. Operating systems commonly generate a number of different parameters indicative of the current load on a system.

A high load on a computing device typically means that some or all of the resources are being fully or almost fully utilized. A low load typically means that there are sufficient resources available to handle additional tasks. As the load on a computing device increases, performance in handling tasks generally suffers. When load exceeds certain critical levels, response times can degrade precipitously.

A web site is typically hosted on a server system which can include one or more computing devices. A low traffic web site, for example, can typically be hosted on a single server computer. A very high traffic web site, for example, will typically include multiple computing devices such as load balancing computers, web server computers, application server computers, and database server computers. The load on such a system can be specified in terms of the loads on the individual physical computing devices that make up the system.

The load on a web server system is affected by a number of factors, such as the number of web page requests being handled simultaneously, the rate at which new requests are being received, and the amount of processing and memory required to handle each request. In order to maintain acceptable user response times, well-maintained web sites have historically been hosted on systems that have sufficient excess capacity to handle peak loads. When the host system is lightly loaded, the excess capacity is unused.

In certain instances, the popularity of a web site increases unexpectedly, and the entity hosting the site does not have the ability (e.g. funds or time) to add server capacity to respond to the increasing loads. In these situations, the site's servers can become overloaded. As a result, wait times for requests can become unacceptable, and some requests may be dropped altogether without a response. When requests are dropped or when wait times become longer than several seconds, users' perceptions of a web site can be adversely affected.

In a paper titled "Reading Course Paper Overview of Internet QoS and Web Server QoS," (Department of Computer Science, The University of Western Ontario, London, Ontario, Canada, Apr. 6, 2000), Nikolaos Vasiliou surveys several application level systems designed to handle peak server loads when serving page requests. The systems surveyed generally propose varying the priority with which requests are handled in order to guarantee reasonable response times for high priority requests. Most of the systems described in the paper prioritize requests based on factors such as how much a web hosting customer is paying for the hosting of a requested web page. One of the systems prioritizes requests based upon the identity of the user requesting the page. These systems, however, end up favoring the high priority requests at the expense of lower priority requests. As a result, when loads increase, lower priority requests are more likely to be delayed or dropped.

Systems that address load problems solely by prioritizing some requests over others are unacceptable in certain contexts. For example, in many environments, long server response times and dropped page requests can result in a loss of customers. The present invention seeks to address this problem, among others.

SUMMARY OF THE INVENTION

The present invention provides a system and method for managing server load levels by varying the quantity of processing resources used in response to like requests for dynamically generated web pages. In accordance with one aspect of the invention, a dynamic page generator monitors load levels associated with one or more servers, services, and/or other components used to generate dynamic web page content. When a page request is received from a user, the dynamic page generator determines how to process the page request based at least in-part on these load levels, such that the quantity of processing resources used in generating the page will generally be inversely proportional to the current load level.

For example, if system load is currently high, the dynamic page generator may limit the depth of processing that will be performed by a recommendations engine or other personalization component in generating personalized content. The dynamic page generator may additionally or alternatively control the type or types of dynamic content included in the requested web page—such as by selecting between two or more alternative web page templates for the requested URL. In this manner, the load placed on the system by each dynamic page request may be varied so as to maintain load levels, and thus page response times, at an acceptable level. The process of determining how to respond to dynamic page requests is referred to herein as a "level of service" determination, as it affects the level of service provided to users.

In accordance with another aspect of the invention, the level of service determination may further take into consideration information about the particular user requesting the dynamic page. For example, a higher level of service may be provided in general to users who frequently access the particular web site, and/or who frequently conduct transactions on the web site, in comparison to other users. Information about the users may also be used to vary caching policies used to cache user profile data within non-volatile server memory, such that profile-based content may be generated more rapidly for frequent or highly-scored users.

Neither this summary nor the following detailed description is intended to define the invention. The invention is defined by the claims.

DETAILED DESCRIPTION OF ILLUSTRATIVE EMBODIMENTS

I. Overview

Figure 1:
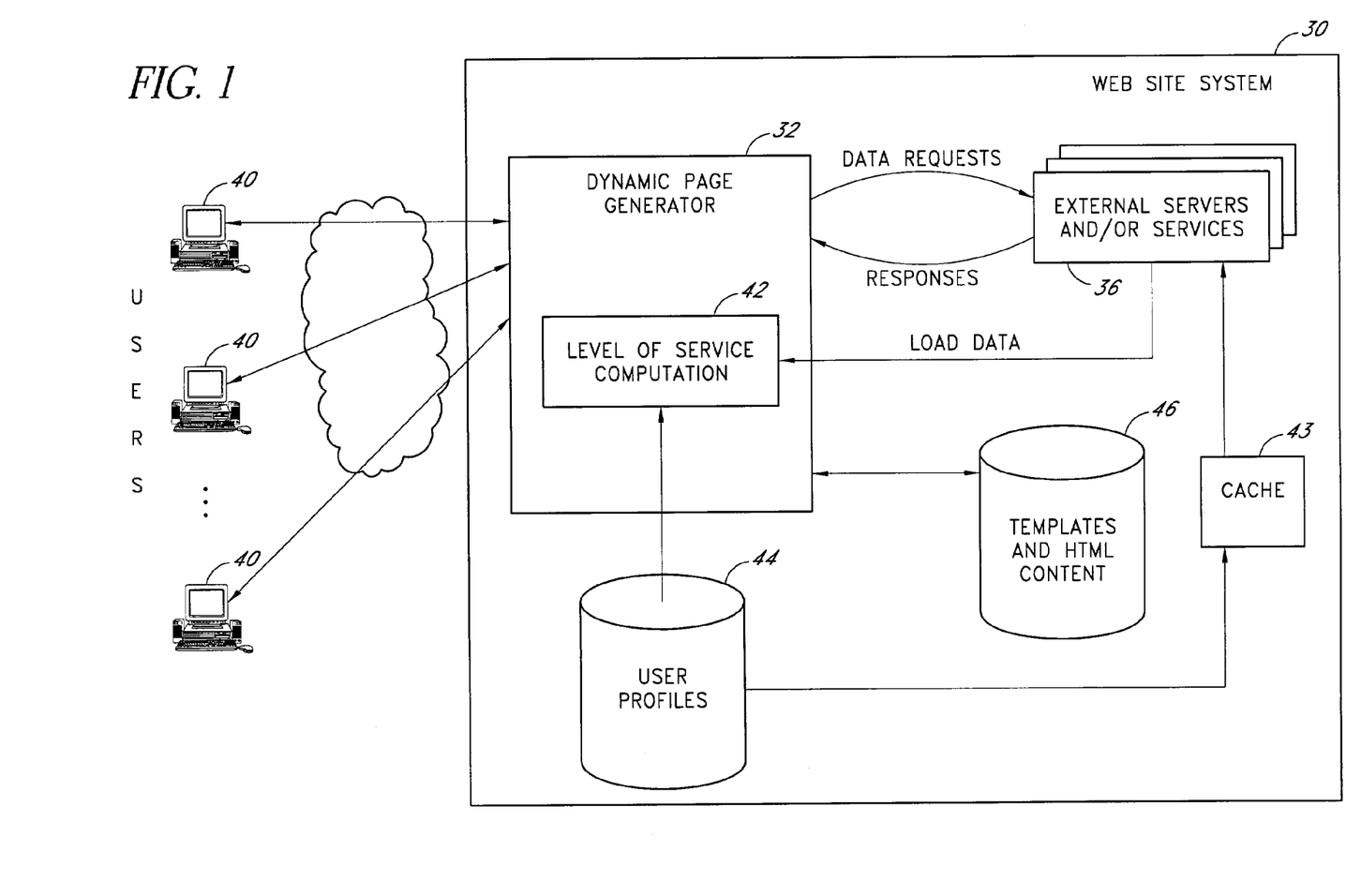
FIG. 1 illustrates the general software architecture of a system which regulates load levels according to one embodiment of the invention.
Figure 2:
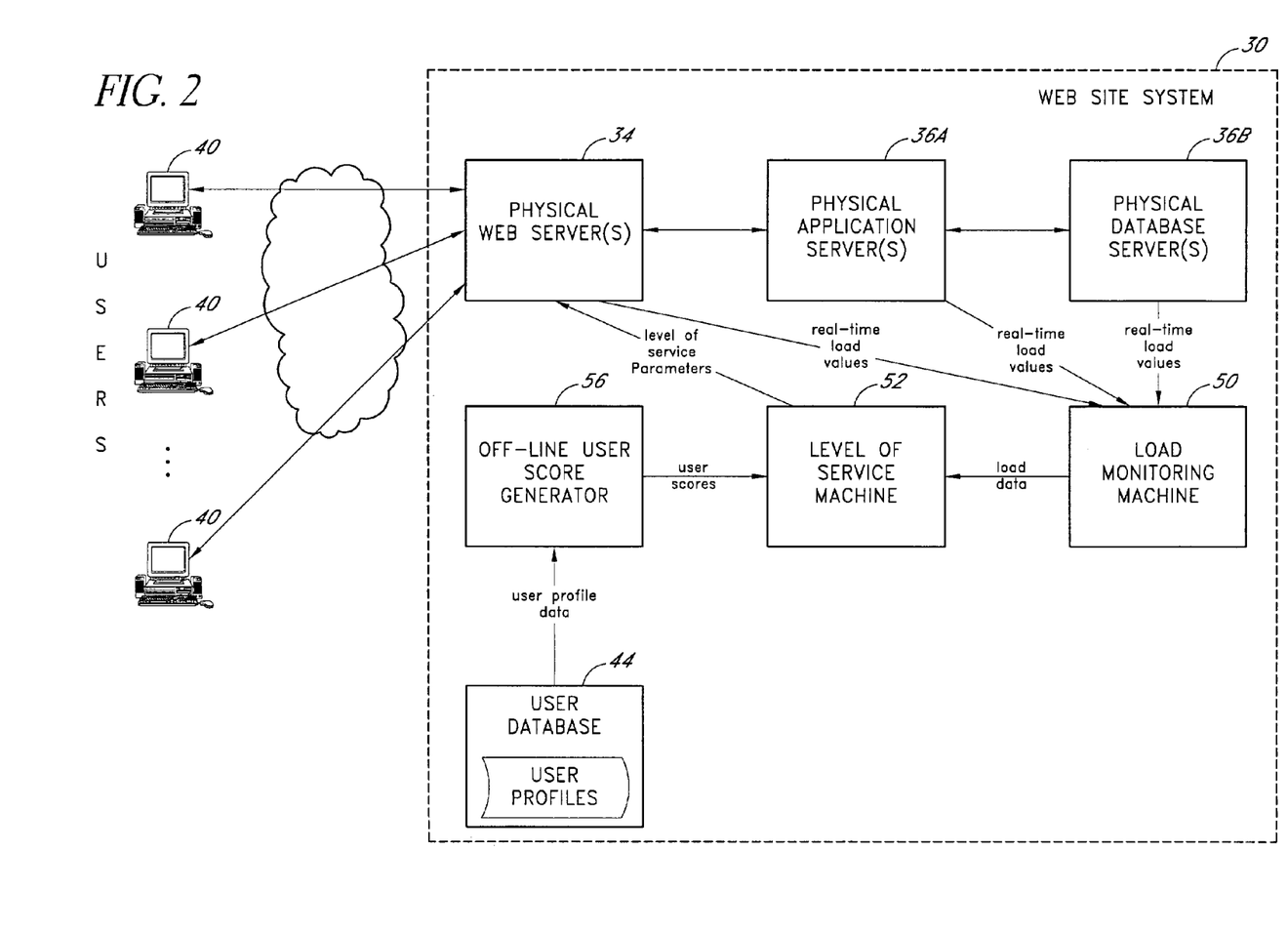
FIG. 2 illustrates an example system configuration that may be used to implement the system of FIG. 1.

FIGS. 1 and 2

FIG. 1 illustrates a web site system 30 that embodies the invention. The system includes a dynamic page generator 32 that responds to page requests received from Internet users. The dynamic page generator 32 may run in-whole or in-part on a physical web server 34 (FIG. 2). The dynamic page generator 32 in the illustrated embodiment communicates with one or more services 36 that generate content incorporated into dynamic web pages. These services may, for example, include one or more recommendations engines that recommend items, such as products, to users based on the respective profiles of such users. Examples of recommendation engines and algorithms that may be used for this purpose are disclosed in U.S. Pat. No. 6,266,649 and published U.S. Patent Application Publication 2002/0198882 A1, the disclosures of which are hereby incorporated by references. The services 36 are preferably implemented as program modules that run on one or more physical servers. For example, each service may be implemented using a different respective server or set of servers. The dynamic page generator 32 may also access a repository 46 of web page templates and HTML content.

As further depicted by FIG. 1, as requests for dynamic web pages are received from user computers 40, the dynamic page generator 32 invokes a level-of-service computation module 42 to determine how to respond to such requests. As illustrated, this level-of-service module 42 may determine how to respond to a given request based on load data associated with the external services 36 or their servers. In addition, the level-of-service module may take into consideration data stored in a user profiles database 44, or user score values generated from such data.

The output of the level-of-service module 42 may be in any of a variety of forms. For example, this module 42 may generate a level-of-service score, such as a value between one and ten, that specifies a level of service to be provided to the user. This score value may then be passed to each service 36 invoked by the particular page request, which may in turn use the score to select the appropriate type and/or quantity of processing to be performed to generate the requested data. The level-of-service module 42 may additionally or alternatively select a web page template that specifies the type or types of dynamic content to be included in the response. Further, the level-of-service module 42 may additionally or alternatively generate one or more service parameters that specify or control the amount of processing that will be performed by a particular service 36 in responding to the request, as described below. Moreover, the level-of-service module 42 may additionally or alternatively determine the amount of and length of time that user data is cached in a cache memory 43. Regardless of the particular form, the output of this module 42 indirectly or directly specifies a level of service to be provided in responding to the page request.

The levels of service are preferably dynamically selected or varied such that the quantity of processing resources used to respond to a request for a given page is generally inversely proportional to the current load level(s) of the invoked component(s) or of the system as a whole. The system in FIG. 1 thus operates in a feedback configuration, reducing the amount of processing performed during heavy load conditions and increasing the amount of processing performed during light load conditions. Preferably, the levels of service are varied so as to maintain response times for all users at an acceptable level, with very little or no need to drop page requests.

FIG. 2 illustrates one example of how the above-described functions may be assigned to physical machines. In this example, the web site system 30 includes one or more physical web servers 34, one or more physical application servers 36A, and one or more physical database servers 36B, all of which communicate over a local area network. The system also includes a load monitoring machine 50 that polls each physical web server 34, application server 36A and database server 36B to obtain real time load values. The real time load values may include various server resource parameters commonly generated by Unix and/or Windows operating systems, and may be requested using application program interfaces (APIs) provided by these operating systems.

Real time load data collected by the load monitoring machine 50 is reported to a level of service machine 52, optionally in an aggregated form in which the loads of multiple machines are appropriately averaged. The level of service machine 52 in this example also receives user score values generated by an off-line user score generator module 56, which may run on any appropriate machine. The user score generator 56 may alternatively be omitted, in which case levels of service may be based solely on load data.

In one embodiment, the user score generator 56 periodically generates a separate score for each user of the system by analyzing the browsing and/or purchase histories of the users. A user's score may, for example, be based on one or more of the following: (a) the amount of time spent by the user browsing the web site, (b) the quantity of transactions conducted by the user on the web site, (c) the length of time since the user set up an account on the web site (d) the user's connection speed. The scores may be generated or updated at any appropriate time, such as when a user finishes a browsing session or completes a transaction. Although the user scores are shown as flowing directly from the user score generator to the level of service machine 52, they may actually be read from the user database 44 as needed to respond to page requests, or may be extracted from browser cookies transmitted with such requests.

The level of service machine 52 generates level of service parameters based on the load data and (preferably) the user scores, as described above, and reports these parameter values to the web servers 34. Preferably, each parameter value or set of parameter values corresponds to a particular page request, and directly or indirectly specifies the amount of processing to be performed in responding to that request. However, in some embodiments, these parameter values may alternatively specify how the web servers 34 should respond to a particular class of request. For example, the level of service machine 52 way instruct the web servers 34 to temporarily disable personalized ranking of search results for all users, or for all users whose score falls below a particular threshold.

II. Example Methods for Limiting Utilization of Processing Resources

One particular method that may be used to control the amount of processing resources used in responding to page requests involves controlling the size of an input data set used to generate personalized page content. For example, in one embodiment, a recommendations service of the type described in U.S. Pat. No. 6,266,649, referenced above, is used to generate personalized recommendations of items, such as products represented in a database. To generate these recommendations, the recommendations service maps an input data set of items that are "known" to be of interest to the user (e.g. those the user has viewed or purchased) to a set of additional items that are deemed likely to be of interest to the user. The amount of processing performed to identify these additional items is directly proportional to the size of the input data set (i.e., the set of "items of known interest"). The recommendations are generated on-the-fly in response to page requests, and are incorporated into the requested web pages.

In accordance with the invention, the quantity of processing performed by the recommendations service is controlled, on a page request by page request basis, by selectively limiting the size of the set of items of known interest used to generate the personalized recommendations. For example, when the server system is lightly loaded, the entire purchase history of a user may be used to generate the personalized recommendations. When, on the other hand, the system is heavily loaded, the recommendations may be generated based solely on the last N (e.g., 5) items purchased by the user, even though the user's purchase history may include a much larger number of items. The value of N may be selected dynamically based on the load of the web server system as a whole, based on the load on the recommendations service, and/or based on information about the particular user. Thus, regardless of the load level, the user is provided with personalized item recommendations, although these recommendations may be based on a relatively small amount of information about the user during heavy load conditions. Recommendations provided during high load conditions may therefore be less tailored or less accurate than recommendations provided during low load conditions.

The amount of processing performed by a search engine or service in response to user-submitted search queries can similarly be controlled. For example, in one embodiment, a product search engine of the web site system ranks search results based on information known about the user, such as the user's purchase history. The goal of this ranking, in one embodiment, is to more prominently display those products that are the most similar to items the user has purchased. An example of a search engine system that uses information about the user (as well as other types of information) to rank search results is described in U.S. Pat. No. 6,185,558. As with the recommendations service example above, the amount of processing performed to generate the personalized ranking may be selectively controlled by limiting the amount of user profile information incorporated into the ranking process. For instance, during heavy load conditions, only a small subset of the user's purchase history may be incorporated into the ranking process, while during light load conditions the user's entire purchase history may be used.

The amount of processing performed by a web server system 30 may also be controlled by effectively turning on and off certain types of services. For example, U.S. Pat. No. 6,144,958 describes a spell checking service used to check the spellings of search terms in search queries; and U.S. Pat. No. 6,006,225 describes a service for suggesting additional search terms to users to assist these users in refining their queries. One or both of these services may be selectively turned off during heavy load conditions, and/or in response to requests from certain classes of users, to reduce the processing load associated with responding to search query submissions. The disclosures of the aforesaid patents are hereby incorporated by reference.

In all of the examples provided above, web pages with meaningful content are always provided to the user (during error-free operation), but according to different levels of service. That is, all or nearly all of the web pages will contain the same type of content, but the amount of processing used to generate the content will vary inversely to the load on the system generating the web pages.

III. Process Flow

Figure 3:
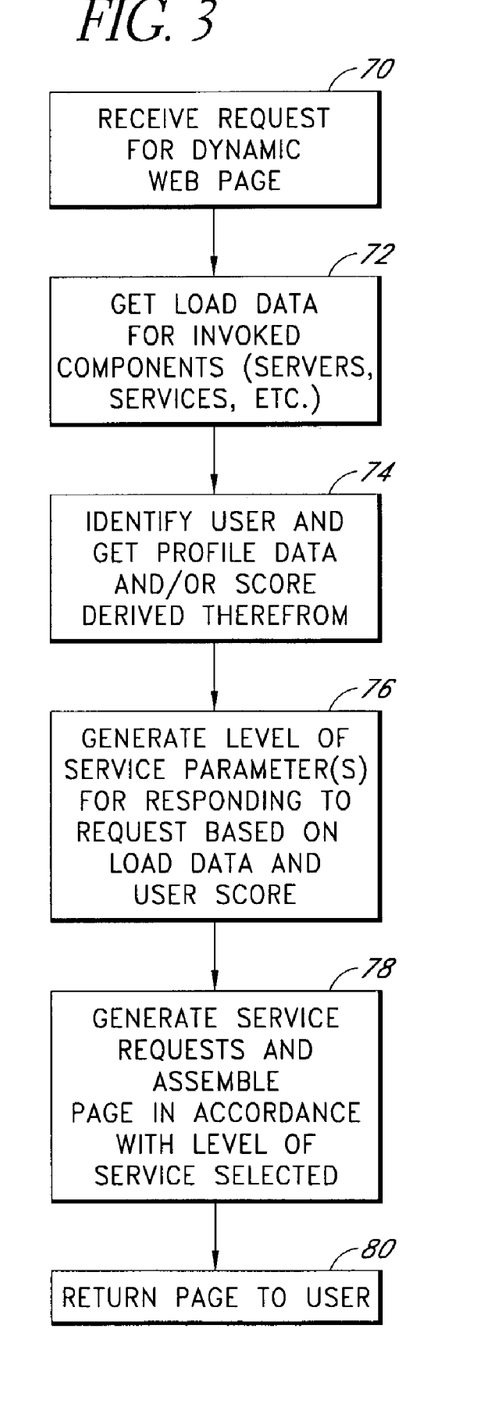
FIG. 3 illustrates an example sequence of steps that may be performed by the dynamic page generator of FIG. 1 in response to a dynamic page request.
Figure 4:
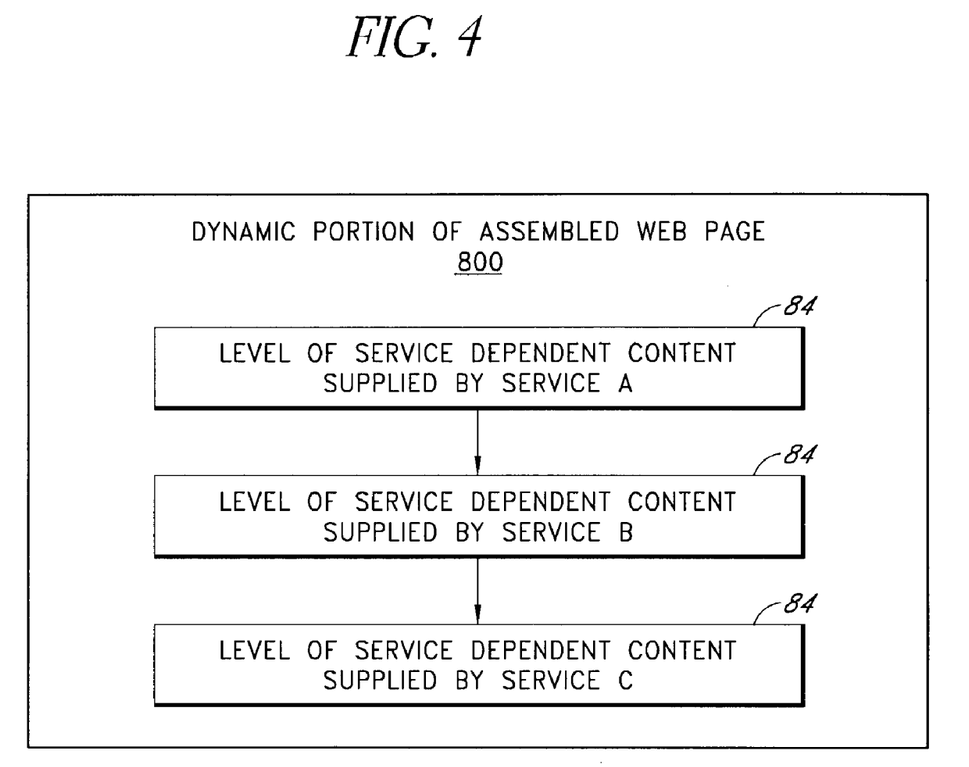
FIG. 4 illustrates the general arrangement of an example web page generated in accordance with the invention.

FIGS. 3 and 4

FIG. 3 illustrates one example of a sequence of steps that may be performed by the dynamic page generator 32 of FIG. 1 to respond to dynamic page requests in accordance with the invention. In response to receiving a dynamic page request from a user (block 70), the dynamic page generator 32 obtains the load data associated with the component or components ordinarily invoked by the request (block 72). For example, if the request is for a page that ordinarily includes personalized recommendations, load data associated with the corresponding recommendations service—or a server on which this service runs—may be obtained. If multiple components 36 are invoked, the load data associated with each such component may be obtained.

The dynamic page generator 32 also identifies the user (typically using a browser cookie transmitted with the page request), and retrieves a profile of the user and/or a user score derived from the user's profile (block 74). If no score exists for the user, the user's profile data may be used to generate a score on-the-fly, or a default score may be used. As depicted by block 76, the dynamic page generator 32 uses the load data and the user score to generate one or more level-of-service parameters for responding to the request (block 78). The level of service parameter(s) may include one or more of the following, and may depend upon the particular URL requested: (1) an identifier of a web page template to be used; (2) a general level-of-service value that applies to all components, (3) separate level-of-service values for specific components or sets of components, (4) one or more depth-of-processing values indicating, e.g., a size of an input data set (such as a set used to generate personalized content), or (5) an indication of specific services or features to be disabled for purposes of generating personalized content.

As depicted by block 78, the dynamic page generator 32 generates service requests to one or more services 36 in accordance with the level-of-service parameter(s) generated in block 76. The data returned by the service or services 36 is then assembled into a dynamic web page, and the web page is returned to the user (block 80).

Although the process shown in FIG. 3 uses separate load data for each invoked component, the levels of service may be based in-whole or in-part on load data reflective of the current load on the web site system as a whole. In addition, although the level-of-service parameters in this example depend upon the identity of the user, they may alternatively be generated without regard to user identity.

Further, the task of selecting levels of service may be performed by the services themselves rather than by a centralized level of service module or computer. For example, in one embodiment, each service has its own respective level-of-service module 42 which may run on a particular server of that service. When a request is passed to such a service, the service (through its own level-of-service module 42) selects an appropriate level of service based on its own load level (and optionally the user's identity), and responds to the request accordingly. Thus, rather than having a central server that dictates the processing for each page, each of the services makes its own level-of-service determinations.

FIG. 4 illustrates the general form of a web page that may be generated according to the process of FIG. 3. In this example, the web page includes three dynamic content sections 84, each of which contains content generated by a different respective service 36. The particular selection of content sections 84 used to respond to a given URL request may depend upon the particular template selected, which may in-turn depend upon the current load levels of the various components or services 36 within the system. In addition, the content included within each section 84 may depend upon the level-of-service parameters associated with the page request. For example, for a content section 84 that includes purchase-history-based recommendations, the recommendations may be based on the entire purchase history of the user if the associated load levels are currently low, and may be based on a subset of this purchase history if load levels are currently high.

As discussed above, the level of service determination or feedback procedure preferably takes into account current system load levels in determining a level of service. Available system memory and available processing capacity are two load factors that may be considered. Another load factor that can be taken into account is a rate at which new web page requests are being received. The rate can be used as a rough measure of the amount of computing resources that can be allocated to responding to each request. In one embodiment, the available resources (e.g. processing cycles per second) can be divided by the rate of receipt (e.g., requests per second) to determine the amount of resources that can be allocated to serving each page without overloading the system.

IV. Data Caching Policies

Personalized content is commonly generated based on user profile data read from a database. To reduce the need to access such a database, some or all of a user's profile data may be maintained in a server system's non-volatile random access memory. Since a server system generally will not have enough random access memory to hold all of the data of all users in its memory, a caching policy is typically used. For example, a user's profile may be retrieved from a database and cached when first needed, and may later be overwritten in the cache memory according to a least-recently-used deletion policy. As a result of the caching policy, a user's first page request after a long period of inactivity may be substantially delayed by the time it takes to retrieve the user's data from a database.

In accordance with one embodiment, the external servers/ and or services 36 vary their caching policy from user-to-user based on the profile of each user, or the user score generated therefrom. For example, for a relatively heavy user of the system, a service or server may do one or more of the following (1) keep a greater quantity of the user's purchase history, browsing history, or other profile data in cache memory (i.e., vary the amount of cache dedicated to a user); or (2) keep the user's profile data in cache memory for a longer period of time (e.g., for several hours or days) since the user's last access to the system, relative to the amount of time used for other users of the system. The servers and/or services 36 may additionally vary their caching policies based on current load data.

Although the invention has been described in terms of certain embodiments, other embodiments that will be apparent to those of ordinary skill in the art, including embodiments which do not provide all of the features and advantages set forth herein, are also within the scope of this invention. Accordingly, the scope of the invention is defined by the claims that follow.

What is claimed is:

1. A web server system, comprising:
a plurality of physical servers that generate personalized web page content in response to page requests from users, wherein the physical servers generate the personalized web page content using user profile data associated with particular users;
a level-of-service module that generates level-of-service parameters based at least in-part on current load levels of the plurality of physical servers; and
a dynamic page generator that responds to the page requests according to the level-of-service parameters such that an amount of processing performed by the physical servers per page request in generating requested web pages decreases as said load level increases, and increases as said load level decreases, wherein the dynamic page generator controls said amount of processing performed by the physical servers at least partly by using the level-of-service parameters to vary a quantity of user profile data used by the physical servers to generate the personalized web page content;
wherein the dynamic page generator is responsive to an increase in said load level by causing the physical servers to reduce, to a non-zero level, an amount of user profile data used to personalize web pages;
whereby load levels are regulated in a feedback configuration.

2. The system of claim 1, wherein the dynamic page generator responds to the page requests according to the level-of-service parameters at least in-part by selecting a depth of processing to be performed in generating said personalized web page content.

3. The system of claim 1, wherein the dynamic page generator responds to the page requests according to the level-of-service parameters at least in-part by selecting a size of an input data set used to generate personalized recommendations.

4. The system of claim 1, wherein the dynamic page generator additionally regulates said load levels by using the level-of-service parameters to select between alternative web page templates used to generate web pages.

5. The system of claim 1, wherein the dynamic page generator additionally regulates said load levels by using the level-of-service parameters to select services to disable for purposes of responding to specific page requests.

6. The system of claim 1, wherein the level-of-service module generates the level-of-service parameters based further upon profiles of users, such that different levels of service are provided to different users of the system.

7. The system of claim 6, wherein the level-of-service module generates the level-of-service parameters such that a higher level of service is generally provided to frequent users over infrequent users.

8. The system of claim 1, wherein the personalized web page content included in web pages generated by the dynamic page generator is dependent upon said level-of-service parameters.

9. The system of claim 1, wherein the dynamic page generator responds to the page requests according to the level-of-service parameters such that a load placed on the web server system by a page request is generally inversely proportional to a current load level of the web server system at a time of said page request.

10. The system of claim 1, wherein the dynamic page generator controls the generation of the personalized web page content by the physical servers such that a quantity of processing resources used by said physical servers to generate personalized content of a given web page is generally inversely proportional to said current load level.

11. The system of claim 10, wherein the dynamic page generator controls the generation of the personalized content, at least in part, by passing the level-of-service parameters to the physical servers.

12. The system of claim 10, wherein said personalized content comprises search results ranked according to information about a particular user.

13. The system of claim 1, wherein the dynamic page generator responds to the page requests such that the web pages generated by the dynamic page generator are generally personalized to a greater extent when said load levels are low.

14. A method, comprising:
providing a plurality of physical servers that generate personalized web page content in response to page requests from users, said physical servers operative to generate the personalized web page content using user profile data associated with particular users;
generating level-of-service parameters using a level of service module, said level-of-service parameters based at least in-part on current load levels of the plurality of physical servers; and
using the level-of-service parameters to vary amounts of user profile data used by the physical servers to generate the personalized web page content such that an amount of computing resources used by the physical servers per page request decreases as a load level of the physical servers increases, and increases as the load level of the physical servers decreases;
wherein using the level of service parameters to vary said amounts of user profile data comprises responding to an increase in said load levels by causing the physical servers to use a decreased but non-zero amount of user profile data to generate the personalized web page content;
whereby load levels are regulated in a feedback configuration.

15. The method of claim 14, wherein the user profile data includes purchase history data reflective of purchases of particular users.

16. The method of claim 14, wherein the method comprises using the level-of-service parameters to select a size of an input data set of user profile data used to generate personalized recommendations.

17. The method of claim 14, wherein the method additionally comprises using the level-of-service parameters to select between alternative web page templates used to generate web pages.

18. The method of claim 14, wherein the method additionally comprises using the level-of-service parameters to select services to disable in responding to specific page requests.

19. The method of claim 14, wherein the method comprises generating the level-of-service parameters based further upon profiles of users, such that different levels of service are provided to different users.

20. The method of claim 14, wherein the method comprises generating web pages that include personalized web page content that is dependent upon said level-of-service parameters.

21. The method of claim 14, wherein the method comprises varying said amounts of user profile data according to the level-of-service parameters such that a load placed on the physical servers by a page request is generally inversely proportional to a current load level at a time of said page request.

22. The method of claim 14, wherein the method comprises controlling the generation of the personalized web page content by the physical servers such that a quantity of processing resources used by said physical servers to generate personalized content of a given web page is generally inversely proportional to said current load level.

23. The method of claim 22, wherein the method comprises controlling the generation of the personalized web page content, at least in part, by passing the level-of-service parameters to the physical servers.

24. The method of claim 22, wherein said personalized web page content comprises search results ranked according to information about a particular user.

25. The method of claim 14, wherein the method comprises varying web page responses such that web pages generated with the physical servers are generally personalized to a greater extent when said load levels are low.

26. The system of claim 1, wherein the dynamic page generator additionally uses the level of service parameters to vary a caching policy used to cache user profile data in non-volatile memory of the physical servers.

27. The system of claim 1, wherein the user profile data used to generate personalized web pages includes purchase history data reflective of purchases made by particular users.

28. The method of claim 14, further comprising using the level of service parameters to vary a caching policy used to cache said user profile data in non-volatile server memory.

29. The method of claim 14, wherein said generation and use of the level-of-service parameters is automated by a computerized system.

* * * * *

UNITED STATES PATENT AND TRADEMARK OFFICE
CERTIFICATE OF CORRECTION

PATENT NO. : 7,624,047 B1
APPLICATION NO. : 10/390067
DATED : November 24, 2009
INVENTOR(S) : Matthew J. Round Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1385 days.

Signed and Sealed this

Twenty-sixth Day of October, 2010

David J. Kappos
*Director of the United States Patent and Trademark Office*